US011206215B2

(12) United States Patent
Tang et al.

(10) Patent No.: US 11,206,215 B2
(45) Date of Patent: Dec. 21, 2021

(54) METHOD AND APPARATUS FOR ROUTING PACKET IN SEGMENT ROUTING NETWORK BASED ON IPV6

(71) Applicant: UTStarcom Telecom Co., Ltd., Hangzhou (CN)

(72) Inventors: Yong-Lin Tang, Hangzhou (CN); Si-Hai Bao, Hangzhou (CN); Feng Liu, Hangzhou (CN); Sheng Yu, Hangzhou (CN)

(73) Assignee: UTStarcom Telecom Co., Ltd., Hangzhou (CN)

( * ) Notice: Subject to any disclaimer, the term of this patent is extended or adjusted under 35 U.S.C. 154(b) by 75 days.

(21) Appl. No.: 16/713,933

(22) Filed: Dec. 13, 2019

(65) Prior Publication Data

US 2020/0195556 A1 Jun. 18, 2020

(30) Foreign Application Priority Data

Dec. 13, 2018 (CN) .......................... 201811528314.3

(51) Int. Cl.
*H04L 12/28* (2006.01)
*H04L 12/749* (2013.01)
*H04L 12/707* (2013.01)
*H04L 12/717* (2013.01)
*H04L 12/721* (2013.01)

(52) U.S. Cl.
CPC ............ *H04L 45/741* (2013.01); *H04L 45/24* (2013.01); *H04L 45/42* (2013.01); *H04L 45/566* (2013.01)

(58) Field of Classification Search
None
See application file for complete search history.

(56) References Cited

U.S. PATENT DOCUMENTS

| 2015/0295816 | A1* | 10/2015 | Roper | H04L 41/14 709/224 |
| 2015/0341307 | A1* | 11/2015 | Page | H04L 45/60 370/392 |
| 2018/0375764 | A1* | 12/2018 | Filsfils | H04L 61/2007 |
| 2019/0082342 | A1* | 3/2019 | Sharma | H04L 43/00 |

* cited by examiner

*Primary Examiner* — Phirin Sam
(74) *Attorney, Agent, or Firm* — Osha Bergman Watanabe & Burton LLP

(57) ABSTRACT

A method for routing a packet in a segment routing network includes extracting a destination Internet Protocol (IP) address from an IP header of the packet received by a routing node wherein the destination IP address includes a network identifier, a node identifier, a function identifier, and an argument; determining whether the network identifier and the node identifier match a routing node identifier; when the network identifier and the node identifier match the routing node identifier, determining a function to be executed based on the function identifier and the argument; when the function to be executed is determined, updating the node identifier, the function identifier, and the argument according to a segment list included in a segment routing header of the packet; and routing the packet according to the updated node identifier, the updated function identifier, and the updated argument in the destination IP address.

10 Claims, 3 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Next Header   | Hdr Ext Len   | Routing Type  | Segments Left |
+-+-+-+-+-+-+-+-+-+-+-+-+-+-+-+-+-+-+-+-+-+-+-+-+-+-+-+-+-+-+-+-+
| Last Entry   |    Flags      |             Tag               |
+-+-+-+-+-+-+-+-+-+-+-+-+-+-+-+-+-+-+-+-+-+-+-+-+-+-+-+-+-+-+-+-+
|                                                               |
|            Segment List[0] (128 bits IPv6 address)            |
|                                                               |
|                                                               |
+-+-+-+-+-+-+-+-+-+-+-+-+-+-+-+-+-+-+-+-+-+-+-+-+-+-+-+-+-+-+-+-+
|                                                               |
|                                                               |
|                              ...                              |
|                                                               |
|                                                               |
+-+-+-+-+-+-+-+-+-+-+-+-+-+-+-+-+-+-+-+-+-+-+-+-+-+-+-+-+-+-+-+-+
|                                                               |
|            Segment List[n] (128 bits IPv6 address)            |
|                                                               |
|                                                               |
+-+-+-+-+-+-+-+-+-+-+-+-+-+-+-+-+-+-+-+-+-+-+-+-+-+-+-+-+-+-+-+-+
//                                                             //
//           Optional Type Length Value objects (variable)     //
//                                                             //
+-+-+-+-+-+-+-+-+-+-+-+-+-+-+-+-+-+-+-+-+-+-+-+-+-+-+-+-+-+-+-+-+
```

FIG. 1

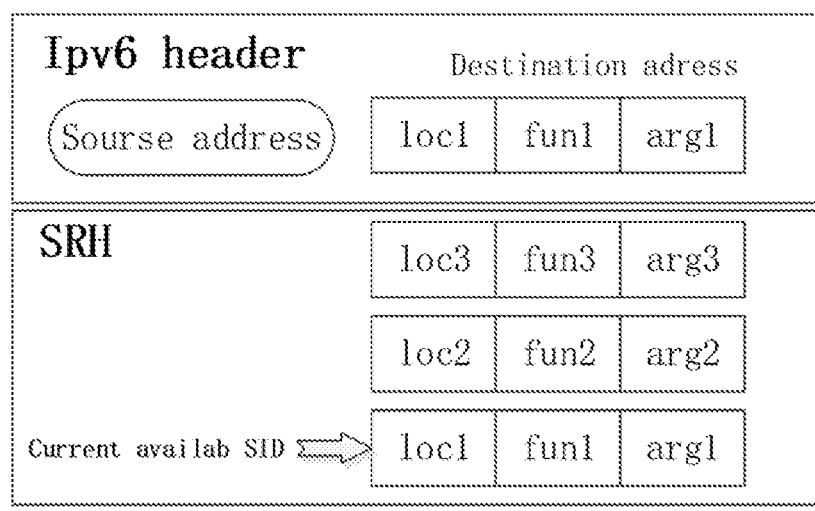

FIG. 2

Determine, from the segment list, a segment identifier whose node identifier, function identifier, and argument match the node identifier, the function identifier, and the argument in the destination IP address, respectively; determine a next segment identifier that is adjacent to the determined segment identifier in the segment list; and determine the node identifier, the function identifier, and the argument of the next segment identifier ⟶ S142

Update the node identifier, the function identifier, and the argument in the destination IP address according to the node identifier, the function identifier, and the argument of the next segment identifier, respectively ⟶ S144

FIG. 5

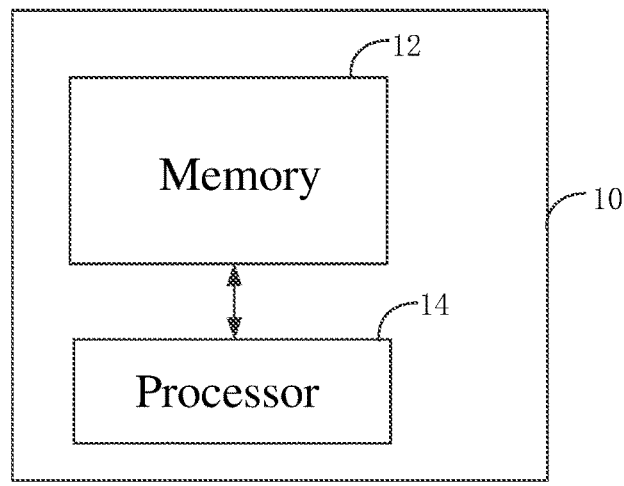

FIG. 6

METHOD AND APPARATUS FOR ROUTING PACKET IN SEGMENT ROUTING NETWORK BASED ON IPV6

BACKGROUND

Embodiments of the present invention relate to packet routing, and in particular, to a method and a routing node for routing a packet in a segment routing network based on Internet Protocol version 6 (IPv6).

SRv6 is a source routing technology in which an extension header called Segment Routing Header (SRH) carries a segment list. In the segment list, each segment is indicated by a 128-bit IPv6 address. Packet routing relies on Internet Protocol (IP) address-encoded information. FIG. 1 shows the definition of SRH given in IETF draft-ietf-6man-segment-routing-header-15.pdf. IETF draft-filsfils-spring-srv6-network-programming-06 describes in detail the encoding of a Segment Identifier (SID) in the form of an IPv6 address. An SID usually includes a node identifier (Locator), a function identifier (Function), and a parameter (Argument), where the node identifier Locator represents the node, and the function identifier Function represents the function to be executed after the node receives the packet. The parameter Argument is appended to Function and represents more specific information, such as information about ports or VPN. Packet encapsulation according to this standardized approach is shown in FIG. 2.

The inventors noted that the existing Function specified in the draft standard is allocated 16 bits, and 16 bits are reserved for Argument. Thus, the collective capacity of Function and Argument will reach 64K, and 128−32=96 bits are left for the node identifier Locator. The number of node identifiers actually represents the number of nodes or virtual nodes in a certain SR network domain. Consider an expanded application: an SR network domain of 1K network elements, each network element having 16 Locators. There are 16K Locators in total. That 16 bits are allocated to a Locator will allow 64K node identifiers. Therefore, in the existing draft standard, a total of 48 bits for encoding is sufficient for the full application of SRv6 as well as future expansions. The remaining 80 bits of information will bring completely unnecessary bandwidth pressure to the network.

SUMMARY

One or more embodiments of the present invention provide a method and a routing node for packet routing in a segment routing network based on IPv6, by which bandwidth pressure can be effectively alleviated.

One or more embodiments of the present invention provide a method for routing a packet in a segment routing network, the segment routing network comprising a plurality of routing nodes, for each of the plurality of routing nodes, the method including:

extracting a destination IP address from an IP header of the packet that is received by the node, the destination IP address comprising a network identifier, a node identifier, a function identifier, and an argument;

determining whether the network identifier and the node identifier in the destination IP address match a routing node identifier;

when the network identifier and the node identifier in the destination IP address match the routing node identifier, determining a function to be executed based on the function identifier and the argument in the destination IP address;

when the function to be executed is determined as to route the packet within the segment routing network, updating the node identifier, the function identifier, and the argument in the destination IP address according to a segment list included in an SRH of the packet, wherein the segment list comprises a plurality of segment identifiers, each segment identifier comprising a node identifier, a function identifier, and an argument; and routing the packet according to the updated node identifier, the updated function identifier, and the updated argument in the destination IP address.

In one or more embodiments, updating the node identifier, the function identifier, and the argument in the destination IP address according to the segment list includes:

determining, from the segment list, a segment identifier whose node identifier, function identifier, and argument match the node identifier, the function identifier, and the argument in the destination IP address, respectively; determining a next segment identifier that is adjacent to the determined segment identifier in the segment list; determining the node identifier, the function identifier, and the argument of the next segment identifier; and updating the node identifier, the function identifier, and the argument in the destination IP address according to the node identifier, the function identifier, and the argument of the next segment identifier, respectively.

In one or more embodiments, the method further includes: when the function to be executed is determined as to route the packet out of the segment routing network, obtaining information of a port from the argument in the destination IP address, and routing the packet, via the port, to a device that is connected to the port.

In another embodiment, the method further includes: when the function to be executed is determined as to route the packet out of the segment routing network, obtaining a list of IP addresses from the argument in the destination IP address, and routing the packet, via ports specified by the list of IP addresses, to devices that are connected to the ports.

In one or more embodiments, the SRH includes information that indicates an overall bit width collectively occupied by a node identifier, a function identifier, and an argument of each segment identifier.

In one or more embodiments, updating the node identifier, the function identifier, and the argument in the destination IP address is further based on the overall bit width.

One or more embodiments of the present invention provide a routing node in a segment routing network, the routing node including a memory, a processor, and a plurality of ports configured to receive and route a packet, wherein the processor:

extracts a destination IP address from an IP header of the packet, the destination IP address comprising a network identifier, a node identifier, a function identifier, and an argument;

determines whether the network identifier and the node identifier in the destination IP address match a routing node identifier that is stored in the memory;

determines, when the network identifier and the node identifier in the destination IP address match the routing node identifier, a function to be executed based on the function identifier and the argument in the destination IP address; and updates, when the function to be executed is determined as to route the packet within the segment routing network, the node identifier, the function identifier, and the argument in the destination IP address according to a segment list included in a segment routing header (SRH) of the packet, wherein the segment list comprises a plurality of segment identifiers, each segment identifier comprising a node identifier, a function identifier, and an argument, and wherein at least one port from the plurality of ports routes the packet according to the updated node identifier, the updated function identifier, and the updated argument in the destination IP address.

In one or more embodiments, to update the node identifier, the function identifier, and the argument in the destination IP address according to the segment list, the processor: determines, from the segment list, a segment identifier whose node identifier, function identifier, and argument match the node identifier, the function identifier, and the argument in the destination IP address, respectively; determines a next segment identifier that is adjacent to the determined segment identifier in the segment list;

determines the node identifier, the function identifier, and the argument of the next segment identifier; and updates the node identifier, the function identifier, and the argument in the destination IP address according to the node identifier, the function identifier, and the argument of the next segment identifier, respectively.

In one or more embodiments, when the function to be executed is determined as to route the packet out of the segment routing network, the processor obtains information of the at least one port from the argument in the IP destination address, and the routing node routes the packet, via the at least one port, to a device that is connected to the at least one port.

In another embodiment, when the function to be executed is determined as to route the packet out of the segment routing network, the processor obtains a list of IP addresses from the argument in the destination IP address, and the routing node routes the packet, via the at least one port specified by the list of IP addresses, to devices that are connected to the at least one port.

In one or more embodiments, the SRH includes information that indicates an overall bit width collectively occupied by a node identifier, a function identifier, and an argument of each segment identifier. In some embodiments, the processor updates the node identifier, the function identifier, and the argument in the destination IP address further based on the overall bit width.

Other aspects of the disclosure will be apparent from the following description and the appended claims.

BRIEF DESCRIPTION OF DRAWINGS

FIG. 1 shows a schematic diagram of an extended header carrying a segment list in the prior art.

FIG. 2 shows a schematic diagram of packet encapsulation in the prior art.

FIG. 5 shows a flowchart of a process executed in step S140 in FIG. 3.

FIG. 6 shows a block diagram of a routing node according to one or more embodiments of the present invention.

DETAILED DESCRIPTION

Specific embodiments of the invention will now be described in detail with reference to the accompanying figures. One having ordinary skill in the art will appreciate that these embodiments and the figures are not intended to limit the scope of the invention and that various other configurations and designs can be devised.

Figure 3:
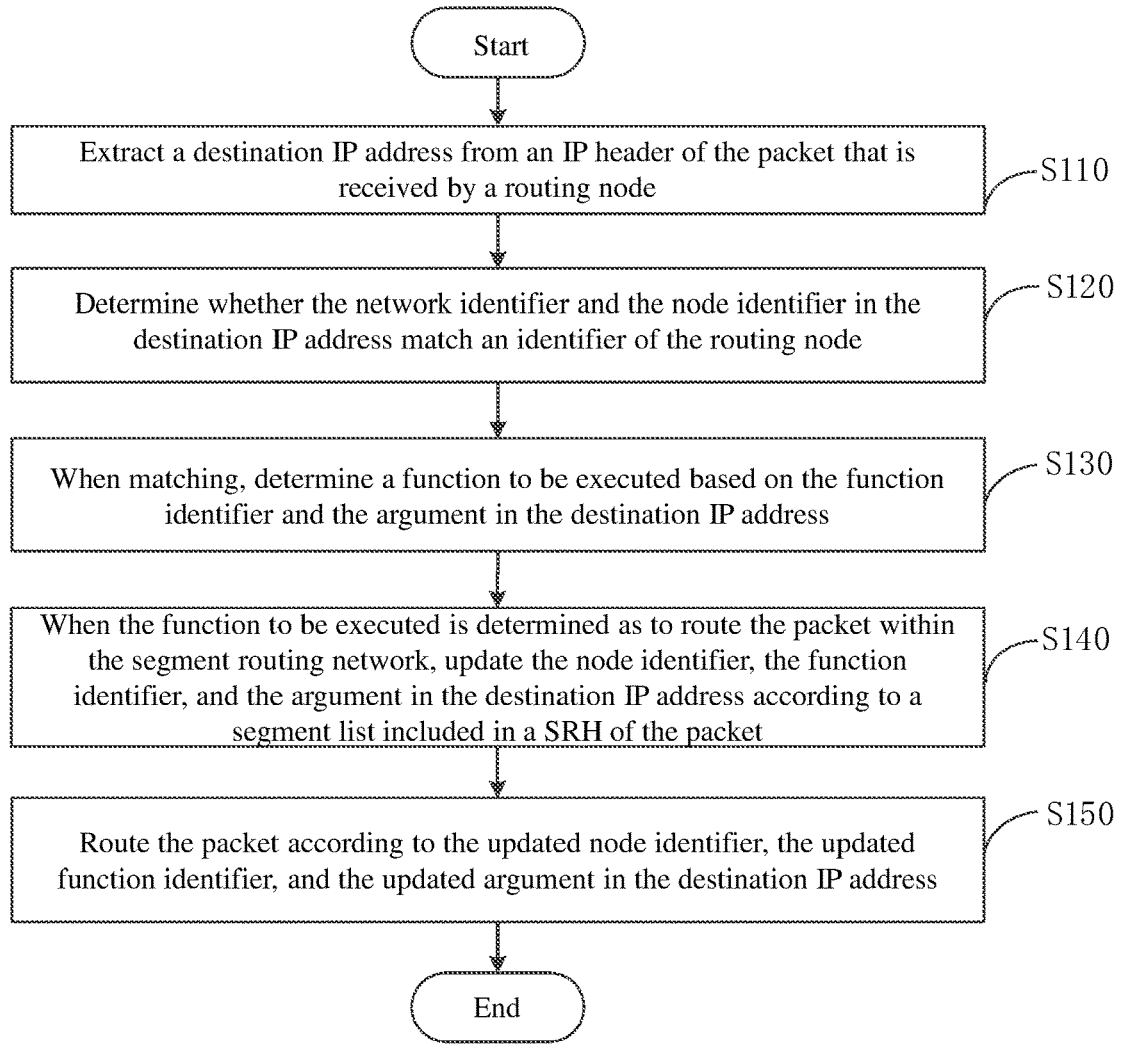
FIG. 3 shows a flowchart of a method for routing a packet in a segment routing network based on IPv6 according to one or more embodiments of the present invention.

Referring to FIG. 3, one or more embodiments of the present invention provide a method for routing a packet in segment routing network based on IPv6. The method can be applied to the routing nodes 10 in the same segment routing network. When the method is applied to any of the routing nodes 10, the following steps are implemented:

Step S110: extracting a destination IP address from an IP header of the packet that is received by a node 10 in FIG. 6.

The destination IP address includes a network identifier, a node identifier, a function identifier, and an argument.

It should be noted that, when the node 10 is a routing node in the segment routing network that receives a packet sent by an external device, before executing step S110, the method further includes encoding the destination IP address in the IP header of the packet, so that the encoded destination IP address includes a network identifier, a node identifier, a function identifier, and an argument.

Step S120: determining whether the network identifier and the node identifier in the destination IP address match an identifier of the routing node 10 (routing node identifier).

It should be noted that the identifier of the routing node 10 includes a network identifier corresponding to the segment routing network where the routing node 10 is located and a node identifier corresponding to the routing node 10. In step S110, when the network identifier in the destination IP address matches the network identifier of the routing node identifier, and the node identifier in the destination IP address matches the node identifier of the routing node identifier, the determination is a match. When the network identifier in the destination IP address does not match the network identifier of the routing node identifier, or when the node identifier in the destination IP address does not match the node identifier of the routing node identifier, the determination is a mismatch. Here, the node identifier may be the network address of the router.

Step S130: when the network identifier and the node identifier in the destination IP address match the routing node identifier, determining a function to be executed based on the function identifier and the argument in the destination IP address.

The function to be executed may be routing the packet within the segment routing network, parsing the packet, sending the packet out of the segment routing network, or the like. It is not particularly limited here.

It should be noted that, in this example, when the determination in step S120 is a mismatch, the method may further include forwarding the packet according to a standard routing and forwarding method based on a destination IP address in the IP header.

Step S140: when the function to be executed is determined as to route the packet within the segment routing network, updating the node identifier, the function identifier, and the argument in the destination IP address according to a segment list included in an SRH of the packet.

The segment list includes a plurality of segment identifiers, each segment identifier including a node identifier, a function identifier, and an argument.

Figure 4:
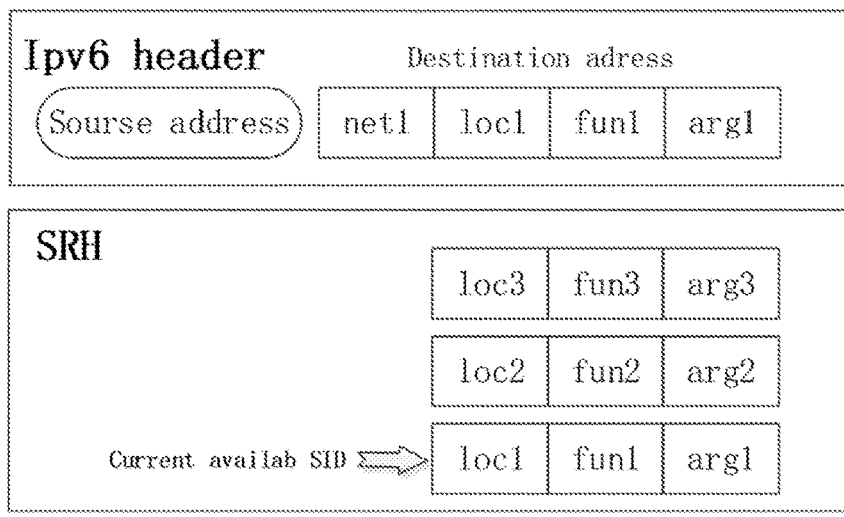
FIG. 4 shows a schematic diagram of packet encapsulation according to one or more embodiments of the present invention.

FIG. 4 is a schematic diagram of a packet encapsulation according to one or more embodiments of the present invention. As shown in FIG. 4, the packet includes an IP header and an SRH. The IP header includes a destination IP address, and the SRH includes a segment list. The destination IP address is includes a network identifier, a node identifier, a function identifier, and an argument. The segment list includes a plurality of segment identifier, each segment identifier including a node identifier, a function identifier, and an argument.

The plurality of segment identifiers included in the segment list may be arranged according to the routing sequence of routing nodes 10 in the segment routing network so as to determine a next segment identifier based on the segment identifier corresponding to the current destination IP address. In some embodiments, each segment identifier may include an identifier corresponding to the next segment identifier, or each segment of routing identification information includes the identification corresponding to the next segment of routing identification information such that the next segment identifier may be determined based on the identifier. It is not particularly limited here.

Step S150: routing the packet according to the updated node identifier, the updated function identifier, and the updated argument in the destination IP address.

With the above configuration, when a packet is being routed in the same segment routing network, each routing node 10 only needs to update the node identifier, the function identifier, and the argument in the destination IP address without updating the network identifier. This avoids the need to carry the network address in all of the segment identifiers in the segment list, so as to avoid occupying too much bandwidth during the routing process.

In order to further avoid occupying too much bandwidth in the packet routing process, in the example illustrated by FIG. 5, the plurality of segment identifiers may be arranged based on routing sequence of the routing nodes 10 in the segment routing network. In this example, step S140 includes:

Step S142: determining, from the segment list, a segment identifier whose node identifier, function identifier, and argument match the node identifier, the function identifier, and the argument in the destination IP address, respectively; determining a next segment identifier that is adjacent to the determined segment identifier in the segment list; and determining the node identifier, the function identifier, and the argument of the next segment identifier.

Step S144: updating the node identifier, the function identifier, and the argument in the destination IP address according to the node identifier, the function identifier, and the argument of the next segment identifier, respectively.

The bit length occupied by the node identifier, function identifier, and argument included in different segment identifiers may be different. Further, the SID in the standard SRH has a granularity of 128 bits. If the number of bits of an SID list is not an integer multiple of 128, the remaining bits of data need to be filled with 0 to ensure that this feature of the SRH does not change, causing excessive memory usage during the packet routing process. In one or more embodiments of the present invention, the SRH of the packet includes information that indicates an overall bit width collectively occupied by a node identifier, a function identifier, and an argument of each segment identifier (indication information). In this case, step S140 may be: updating the node identifier, the function identifier, and the argument in the destination IP address further based on the overall bit width.

In some embodiments, the indication information may further include the bit widths respectively occupied by the node identifier, the function identifier, and the argument. In this case, the node identifier, the function identifier, and the argument in the destination IP address may be updated based on each of the bit widths respectively occupied by the node identifier, the function identifier, and the argument of each segment identifier included in the SRH.

It should be noted that, in this example, the indication information may be carried by an identification field (flags field) in an SRH shown in FIG. 1.

In one or more embodiments, after step S140 is performed, and when the function to be executed is determined as to route the packet out of the segment routing network, the method may further include:

obtaining information of a port from the argument in the destination IP address, and routing the packet, via the port, to a device that is connected to the port. Alternatively, the method may include: when the function to be executed is determined as to route the packet out of the segment routing network, obtaining a list of IP addresses from the argument in the destination IP address, and routing the packet, via ports specified by the list of IP addresses, to devices that are connected to the ports.

By the above configuration, the packet is forwarded to other devices, which may be terminal devices or servers.

Referring to FIG. 6, one or more embodiments of the present invention provide a routing node 10. A segment routing network may be composed of a plurality of routing nodes 10. The routing node 10 includes a memory 12, a processor 14, and a plurality of ports (not shown) configured to receive and route a packet.

The memory 12 and the processor 14 are directly or indirectly electrically connected to each other to implement data transmission or interaction. For example, these components can be electrically connected to each other through one or more communication buses or signal lines. The memory 12 stores a software program or instructions, which, when run or executed by the processor 14, implement a method for routing a packet in a segment routing network based on IPv6 according to one or more embodiments of the present invention.

The memory 12 may be Random Access Memory (RAM), Read Only Memory (ROM), Programmable Read-Only Memory (PROM), Erasable Programmable Read-Only Memory (EPROM), Electrically Erasable Programmable Read-Only Memory (EEPROM) or the like.

The processor 14 may be an integrated circuit chip and have a signal processing capability. In some embodiments, the processor 14 may be a general-purpose processor, including a central processing unit (CPU), a network processor (Network Processor, NP), or the like. In other embodiments, the processor 14 may be a digital signal processor (DSP), an application specific integrated circuit (ASIC), a field programmable gate array (FPGA) or other programmable logic device, a discrete gate or transistor logic device, or a discrete hardware component. The general-purpose processor may be a microprocessor, or the processor may be any conventional processor or the like.

In one or more embodiments, the processor 14 extracts a destination IP address from an IP header of the packet, the destination IP address including a network identifier, a node identifier, a function identifier, and an argument. In other words, the processor 14 may be configured to execute step S110 shown in FIG. 3.

In one or more embodiments, the processor 14 further determines whether the network identifier and the node identifier in the destination IP address match a routing node identifier that is stored in the memory 12, that is, a routing node identifier of the routing node 10. In other words, the processor 14 may be configured to execute step S120 shown in FIG. 3.

In one or more embodiments, the processor 14 further determines, when the network identifier and the node identifier in the destination IP address match the routing node identifier, a function to be executed based on the function identifier and the argument in the destination IP address. In other words, the processor 14 may be configured to execute step S130 shown in FIG. 3.

In one or more embodiments, the processor 14 further updates, when the function to be executed is determined as to route the packet within the segment routing network, the node identifier, the function identifier, and the argument in the destination IP address according to a segment list included in an SRH of the packet. In other words, the processor 14 may be configured to execute step S140 shown in FIG. 3.

In one or more embodiments, the SRH further includes information that indicates an overall bit width collectively occupied by a node identifier, a function identifier, and an argument of each segment identifier. In this example, the processor 14 may update the node identifier, the function identifier, and the argument in the destination IP address further based on the overall bit width.

In one or more embodiments, at least one port from the plurality of ports routes the packet according to the updated node identifier, the updated function identifier, and the updated argument in the destination IP address. In other words, the plurality of ports may be configured to execute step S150 shown in FIG. 3.

In this example, the routing node 10 is further configured to, when the network identifier and the node identifier do not match the identifier of the routing node 10, forward the packet based on a destination IP address in the IP header according to a standard routing and forwarding method.

In this example, when the function to be executed is determined as to route the packet out of the segment routing network, the processor 14 obtains information of the at least one port from the argument in the IP destination address, and the routing node routes the packet, via the at least one port, to a device that is connected to the at least one port. Alternatively, when the function to be executed is determined as to route the packet out of the segment routing network, the processor 14 obtains a list of IP addresses from the argument in the destination IP address, and the routing node routes the packet, via the at least one port specified by the list of IP addresses, to devices that are connected to the at least one port.

In one or more embodiments, the processor 14 may be further configured to execute steps S142 and S144 shown in FIG. 5.

Specifically, the processor 14: determines, from the segment list, a segment identifier whose node identifier, function identifier, and argument match the node identifier, the function identifier, and the argument in the destination IP address, respectively; determines a next segment identifier that is adjacent to the determined segment identifier in the segment list; and determines the node identifier, the function identifier, and the argument of the next segment identifier (S142).

The processor 14 then updates the node identifier, the function identifier, and the argument in the destination IP address according to the node identifier, the function identifier, and the argument of the next segment identifier, respectively (S144).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing a packet in a segment routing network, the segment routing network comprising a plurality of routing nodes, for each of the plurality of routing nodes, the method comprising:
   extracting a destination Internet Protocol (IP) address from an IP header of the packet that is received by the node, the destination IP address comprising a network identifier, a node identifier, a function identifier, and an argument;
   determining whether the network identifier and the node identifier in the destination IP address match a routing node identifier;
   when the network identifier and the node identifier in the destination IP address match the routing node identifier, determining a function to be executed based on the function identifier and the argument in the destination IP address;
   when the function to be executed is determined as to route the packet within the segment routing network, updating the node identifier, the function identifier, and the argument in the destination IP address according to a segment list included in a segment routing header (SRH) of the packet,
      wherein the segment list comprises a plurality of segment identifiers, each segment identifier comprising a node identifier, a function identifier, and an argument; and
   routing the packet according to the updated node identifier, the updated function identifier, and the updated argument in the destination IP address,
   wherein the SRH comprises information that indicates an overall bit width collectively occupied by a node identifier, a function identifier, and an argument of each segment identifier.

2. The method according to claim 1, wherein updating the node identifier, the function identifier, and the argument in the destination IP address according to the segment list comprises:
   determining, from the segment list, a segment identifier whose node identifier, function identifier, and argument match the node identifier, the function identifier, and the argument in the destination IP address, respectively;
   determining a next segment identifier that is adjacent to the determined segment identifier in the segment list;
   determining the node identifier, the function identifier, and the argument of the next segment identifier; and
   updating the node identifier, the function identifier, and the argument in the destination IP address according to the node identifier, the function identifier, and the argument of the next segment identifier, respectively.

3. The method according to claim 1, further comprising:
   when the function to be executed is determined as to route the packet out of the segment routing network, obtaining information of a port from the argument in the destination IP address, and routing the packet, via the port, to a device that is connected to the port.

4. The method according to claim 1, further comprising:
   when the function to be executed is determined as to route the packet out of the segment routing network, obtaining a list of IP addresses from the argument in the destination IP address, and routing the packet, via ports specified by the list of IP addresses, to devices that are connected to the ports.

5. The method according to claim 1, wherein updating the node identifier, the function identifier, and the argument in the destination IP address is further based on the overall bit width.

6. A routing node in a segment routing network, comprising:
a memory;
a processor; and
a plurality of ports configured to receive and route a packet, wherein the processor:
extracts a destination Internet Protocol (IP) address from an IP header of the packet, the destination IP address comprising a network identifier, a node identifier, a function identifier, and an argument;
determines whether the network identifier and the node identifier in the destination IP address match a routing node identifier that is stored in the memory;
determines, when the network identifier and the node identifier in the destination IP address match the routing node identifier, a function to be executed based on the function identifier and the argument in the destination IP address; and
updates, when the function to be executed is determined as to route the packet within the segment routing network, the node identifier, the function identifier, and the argument in the destination IP address according to a segment list included in a segment routing header (SRH) of the packet,
wherein the segment list comprises a plurality of segment identifiers, each segment identifier comprising a node identifier, a function identifier, and an argument,
wherein at least one port from the plurality of ports routes the packet according to the updated node identifier, the updated function identifier, and the updated argument in the destination IP address, and
wherein the SRH comprises information that indicates an overall bit width collectively occupied by a node identifier, a function identifier, and an argument of each segment identifier.

7. The routing node according to claim 6, wherein, to update the node identifier, the function identifier, and the argument in the destination IP address according to the segment list, the processor:
determines, from the segment list, a segment identifier whose node identifier, function identifier, and argument match the node identifier, the function identifier, and the argument in the destination IP address, respectively;
determines a next segment identifier that is adjacent to the determined segment identifier in the segment list;
determines the node identifier, the function identifier, and the argument of the next segment identifier; and
updates the node identifier, the function identifier, and the argument in the destination IP address according to the node identifier, the function identifier, and the argument of the next segment identifier, respectively.

8. The routing node according to claim 6, wherein, when the function to be executed is determined as to route the packet out of the segment routing network, the processor obtains information of the at least one port from the argument in the IP destination address, and the routing node routes the packet, via the at least one port, to a device that is connected to the at least one port.

9. The routing node according to claim 6, wherein, when the function to be executed is determined as to route the packet out of the segment routing network, the processor obtains a list of IP addresses from the argument in the destination IP address, and the routing node routes the packet, via the at least one port specified by the list of IP addresses, to devices that are connected to the at least one port.

10. The routing node according to claim 6, wherein the processor updates the node identifier, the function identifier, and the argument in the destination IP address further based on the overall bit width.

* * * * *